(12) United States Patent
Cotner et al.

(10) Patent No.: US 7,743,036 B2
(45) Date of Patent: *Jun. 22, 2010

(54) HIGH PERFORMANCE SUPPORT FOR XA PROTOCOLS IN A CLUSTERED SHARED DATABASE

(75) Inventors: Curt Lee Cotner, Gilroy, CA (US); Brian K. Howell, San Jose, CA (US); Jeffrey William Josten, San Jose, CA (US); James Willis Pickel, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 332 days.

This patent is subject to a terminal disclaimer.

(21) Appl. No.: 11/764,962

(22) Filed: Jun. 19, 2007

(65) Prior Publication Data

US 2007/0239719 A1    Oct. 11, 2007

Related U.S. Application Data

(63) Continuation of application No. 10/726,700, filed on Dec. 4, 2003, now Pat. No. 7,260,589.

(51) Int. Cl.
    *G06F 17/30* (2006.01)
(52) U.S. Cl. ........................ 707/674; 707/703
(58) Field of Classification Search ......... 707/200–204, 707/1
    See application file for complete search history.

(56) References Cited

U.S. PATENT DOCUMENTS

| | | | |
|---|---|---|---|
| 5,668,943 A | 9/1997 | Attanasio et al. | 395/182.05 |
| 5,790,788 A | 8/1998 | Badovinatz et al. | 395/200.31 |
| 5,793,962 A | 8/1998 | Badovinatz et al. | 395/200.31 |
| 5,805,786 A | 9/1998 | Badovinatz et al. | 395/182.02 |
| 5,896,503 A | 4/1999 | Badovinatz et al. | 395/200.31 |

(Continued)

FOREIGN PATENT DOCUMENTS

JP    6202996    7/1994

(Continued)

OTHER PUBLICATIONS

Oracle9i Database Administrator's Guide Release 2 (9.2), Part No. A96521-01, pp. 1-21, 2002.

(Continued)

*Primary Examiner*—Cheryl Lewis
(74) *Attorney, Agent, or Firm*—IP Authority, LLC; Ramraj Soundararajan; Elissa Wang

(57) ABSTRACT

A shared memory device called the Coupling Facility (CF) is used to record the indoubt transaction entries for each member of the database cluster, avoiding the CPU cost and elapsed time impact of persisting this information to disk (either via a log write or a relational table I/O). The CF provides full read/write access and data coherency for concurrent access by all the members in the database cluster. At any given point in time, the CF will contain the full list of indoubt transactions for the entire database cluster. CF duplexing is used to guarantee the integrity of the CF structure used for the indoubt list. In the event of complete loss of both CF structures (which will not happen except in major disaster situations), data sharing group restart processing can reconstruct the CF structures from the individual member logs.

27 Claims, 5 Drawing Sheets

U.S. PATENT DOCUMENTS

| | | | |
|---|---|---|---|
| 6,014,669 | A | 1/2000 | Slaughter et al. ............... 707/10 |
| 6,684,223 | B1 | 1/2004 | Ganesh et al. ............... 707/200 |
| 7,260,589 | B2 * | 8/2007 | Cotner et al. ............... 707/202 |
| 2003/0018732 | A1 | 1/2003 | Jacobs et al. ................ 709/208 |
| 2003/0023898 | A1 | 1/2003 | Jacobs et al. .................. 714/15 |

OTHER PUBLICATIONS

Hui-I Hsiao et al., "DLFM: A Transactional Resource Manager," IBM Almaden Research Center, 2000, pp. 518-528.

C. Mohan et al., "Method for Distributed Transaction Commit and Recovery Using Byzantine Agreement With Clusters of Processors," IBM San Jose Research Laboratory, 1983, pp. 89-103.

Liba Svobodova, File Servers for Network-Based Distributed Systems, *Computing Surveys*, V16, N4, Dec. 1984, pp. 353-372.

Raj Tewari, "Advanced Database Systems," Springer-Verlag, New York, 1993, pp. 277-287.

Yan Wang et al., "A Mobile Agent Based Protocol for Distributed Databases Access," *IEEE*, 2000, pp. 2028-2033.

* cited by examiner

HIGH PERFORMANCE SUPPORT FOR XA PROTOCOLS IN A CLUSTERED SHARED DATABASE

RELATED APPLICATIONS

This application is a continuation of U.S. application Ser. No. 10/726,700, U.S. Pat. No. 7,260,589 filed Dec. 4, 2003.

BACKGROUND OF THE INVENTION

1. Field of Invention

The present invention relates generally to the field of relational databases. More specifically, the present invention is related to a shared memory device aiding in the implementation of robust 2-phase commit protocols.

2. Discussion of Prior Art

The Open Group's XA protocol has become a computer industry standard for performing 2-phase commit operations between transaction managers and resource managers. FIG. 1 illustrates a functional relationship between transaction manager (e.g., WebSphere®, WebLogic®, etc.) 102 and resource manager (e.g., DB2®, Oracle®, SQL Server, etc.) 104 on the Unix® and Microsoft Windows® platforms. Resource manager (RM) 104 is responsible for managing a part of a computer's shared resources (i.e., software entities can request access to a resource from time to time, using services that the RM provides), while transaction manager 102 is responsible for managing global transactions, coordinating the decision to commit them or roll them back, and coordinating failure recovery.

Transaction manager 102 and resource manager 104 use a 2-phase commit with presumed rollback. In a first phase, transaction manager 102 asks resource manager 104 to prepare to commit transaction branches (i.e., resource manager 104 is queried to see if it can guarantee the ability to commit a transaction branch). If resource manager 104 is able to commit, it records any pertinent information it needs to do so, then replies affirmatively. A negative reply indicates failure of a transaction. After making a negative reply and rolling back its work, resource manager 104 can discard any knowledge it has of the transaction branch.

In a second phase, transaction manager 102 issues resource manager 104 an actual request to commit or roll back the transaction branch. Prior to issuing requests to commit, transaction manager 102 records decisions to commit, as well as a list of all involved resource managers (in this case, resource manager 104). Resource manager 104 either commits or rolls back changes to resources and then returns status to the transaction manager 102. Transaction manager 102 can then delete entries related to the global transaction.

Although XA is an industry standard, it is not nearly as robust as some of the proprietary 2-phase commit protocols that have been developed on other platforms such as OS/390 (e.g., IBM's systems network architecture (SNA) 2-phase commit used by Information Management Service (IMS) and IBM's customer information control system (CICS), resource recovery services (RRS) 2-phase commit used by WebSphere and DB2, and distribution relational database architecture (DRDA) 2-phase commit used by the DB2 family of products).

Provided below, and as depicted in FIG. 2, the following examples illustrate some of the scenarios where the XA protocol is less robust than some of the proprietary 2-phase commit protocols:

XA requires that transaction manager 102 drive the XA RECOVER algorithm 206 to resolve indoubt units of work. Transaction manager 102 calls XA_RECOVER( ) algorithm during recovery to obtain a list of transaction branches that are currently in a prepared or heuristically completed state. It should be noted that there is no provision for resource manager 104 to initiate the resolution of an indoubt unit of work.

XA RECOVER 206 requires that resource manager 104 provide a full list of indoubt transactions, but it has no provision where the members of a database server cluster can resolve indoubt units of work individually with the transaction manager 102. FIG. 3 specifically illustrates this scenario, wherein a full list of indoubt transactions 302 are passed on to XA RECOVER algorithm 303, but a member 304 of a database server cluster is unable to resolve individual indoubt units of work 306, 308, and 310 with transaction manager 102.

Indoubt units of work are typically resolved in XA during transaction manager 102 restart, as there's very little support for automatically resolving an indoubt unit of work that occurs due to a communication failure on a single network connection (i.e., only 1 of the "n" communication connections failed), without restarting the transaction manager 102.

Furthermore, database systems are increasingly using hardware clustering technology to improve the overall availability of database servers. When database systems exploit clustering, they strive to provide a single-system image for the cluster of server machines, so that the clients (such as an XA transaction manager) are unaware that multiple physical machines are being used to run the database product. This creates a dilemma for satisfying the above-mentioned XA RECOVER requirement (i.e., that any member of the database cluster must be able to provide a full list of indoubt transactions upon demand, and this list must include indoubt transactions for all members of the database server cluster) while still allowing the XA RECOVER to occur when one or more members of the database server cluster are not available. Listed below are a few techniques currently available to address this requirement, but it should be stressed that each of these techniques have their own limitations:

a) client-side logging—this approach has the database client middleware write special log records on the client that record the list of indoubt transactions, wherein the database client middleware is able to consult the log to obtain a full list of indoubt transactions, without relying upon the availability of any of the database server members (it should be noted that one disadvantage of this approach is that the database client log becomes an object that must be handled for application server failover planning, backup, recovery, etc. and, moreover, this approach introduces a lot of additional administrative overhead for the customer).

b) server-side indoubt table—with this approach, the database client middleware performs INSERTs and DELETEs with a special table at the database server to keep track of indoubt transactions across the members of the database cluster (it should be noted that although this approach solves the above-mentioned administration overhead issues, it has negative performance implications in that additional INSERT and DELETE operations have to be performed to the relational table, with such operations introducing additional logging, etc.).

c) database cluster support for XA RECOVER—the database engine can provide support for the merged list of indoubt transactions through various means:
a single log stream that contains the log records from all the members of the database cluster;

a special table containing the indoubt units of work at any given point in time; and special XA RECOVER logic that merges the logs produced by all the members of the database cluster to produce a unified list of indoubt transactions for the cluster.

Each of the above-mentioned techniques would have negative performance or scalability implications for the database cluster. Hence, there exists a need to resolve the XA RECOVER requirement in a cluster of database servers:

without requiring all the members of the database cluster to be active during XA RECOVER—without introducing significant added CPU or elapsed time cost for processing the database transactions; and without limiting the scalability of the database cluster.

The following references provide for a general teaching in the area of distributed computing and database configuration.

The U.S. Pat. No. 6,014,669 to Slaughter et al., assigned to Sun Microsystems, provides for a highly-available distributed cluster configuration database. The cluster configuration database is a distributed configuration database wherein a consistent copy of the configuration database is maintained on each active node of the cluster. Each node in the cluster maintains its own copy of the configuration database and configuration database operations can be performed from any node. Configuration database updates are automatically propagated to each node in a lock-step manner. If any node experiences a failure, the configuration database uses a reconfiguration protocol to insure consistent data in each node of the cluster.

The U.S. Pat. No. 5,805,786 to Badovinatz et al., assigned to International Business Machines, provides for the recovery of a name server managing membership of a domain of processors in a distributed computer environment which includes detecting the failure of the name server node and consulting a membership list of nodes in the domain to determine the crown prince (CP) node who is next in line to become the name server. The other available nodes in the domain periodically send recover messages to the CP node, and responsive to receiving the recover messages from all the other available nodes in the domain, the CP node perform a two phase takeover whereby the CP node becomes the name server for managing said processors in the domain. After the CP node becomes the name server, the other available nodes in the domain send data to the new name server necessary for the name server to manage the other available nodes in the domain. All request messages requesting management by the name server are stored locally until after the CP becomes the name server. The locally stored request messages are then processed by the other available nodes such that no request messages are lost during recovery. U.S. Pat. Nos. 5,896,503 and 5,790,788, also assigned to International Business Machines, provide for similar teachings.

The U.S. Pat. No. 5,668,943 to Attanasio et al., assigned to International Business Machines, provides for a system and method for recovering from failures in the disk access path of a clustered computing system. Each node of the clustered computing system is provided with proxy software for handling physical disk access requests from applications executing on the node and for directing the disk access requests to an appropriate server to which the disk is physically attached. The proxy software on each node maintains state information for all pending requests originating from that node. In response to detection of a failure along the disk access path, the proxy software on all of the nodes directs all further requests for disk access to a secondary node physically attached to the same disk.

The patent publication to Jacobs et al. (2003/0018732) discloses a method for replicating data over a network using a one or two phase method. For the one phase method, a master server containing an original copy of the data sends a version number for the current state of the data to each slave on the network so that each slave can request a delta from the master. The delta that is requested contains the data necessary to update the slave to the appropriate version of the data. For the two phase method, the master server sends a packet of information to each slave. The packet of information can be committed by the slaves if each slave is able to process the commit. Patent publication 2003/0023898, also by Jacobs et al., provides for a similar teaching.

The Japanese patent to Brockmeyer et al., assigned to International Business Machines, discloses an expansion function of the two-phase commit protocol which attains the subscription of distributed subscribers between physically separated agents without relying upon the communication mechanism used in data processing systems.

The non-patent literature to Svobodova entitled, "File Servers for Network-Based Distributed Systems," discloses a file server that provides remote centralized storage with options for performing an atomic update of data stored in the file server.

The non-patent literature to Mohan et al., entitled "Method for Distributed Transaction Commit and Recovery Using Byzantine Agreement Within Clusters of Processors," replaces the second phase of one of the commit algorithms with a Byzantine agreement, allowing for certain trade-offs and advantages at the time of commit (thereby providing speed advantages at the time of recovery from failure).

The non-patent literature to Wang et al. entitled, "A Mobile Agent Based Protocol for Distributed Database Access," provides for a three-tier protocol to improve data transmission while accessing distributed databases.

The non-patent literature to Hsial entitled, "DLFM: A Transactional Resource Manager," provides for a two-phase commit protocol and a scheme for enabling rolling back a transaction update after a commit to the local database.

Chapter 14 of the book entitled "Advanced Database Systems" provides a review of parallel recovery in replicated databases.

Whatever the precise merits, features, and advantages of the above cited references, none of them achieve or fulfills the purposes of the present invention.

SUMMARY OF THE INVENTION

The present invention provides for a shared memory device called the Coupling Facility (CF) used to record the indoubt transaction entries for each member of the database cluster, avoiding the CPU cost and elapsed time impact of persisting this information to disk (either via a log write or a relational table I/O). The CF provides full read/write access and data coherency for concurrent access by all the members in the database cluster. At any given point in time, the CF will contain the full list of indoubt transactions for the entire database cluster. The approach of the present invention has numerous advantages over the prior art, some of which include: no additional logging overhead, no additional SQL statements, very minimal CPU cost or I/O latency due to the store/delete operations against the CF for the indoubt list, the CF can provide the full list of indoubt transactions even when one or more members of the database cluster are unavailable, and excellent scalability characteristics, since each member of the database cluster can operate with independent log streams and minimal contention on the CF structure.

In an extended embodiment, CF duplexing is used to guarantee the integrity of the CF structure used for the indoubt list. In the event of complete loss of both CF structures (which will not happen except in major disaster situations), data sharing group restart processing can reconstruct the CF structures from the individual member logs.

BRIEF DESCRIPTION OF THE DRAWINGS

FIG. 4b illustrates a method associated with the embodiment of FIG. 4a.

DESCRIPTION OF THE PREFERRED EMBODIMENTS

Figure 1:
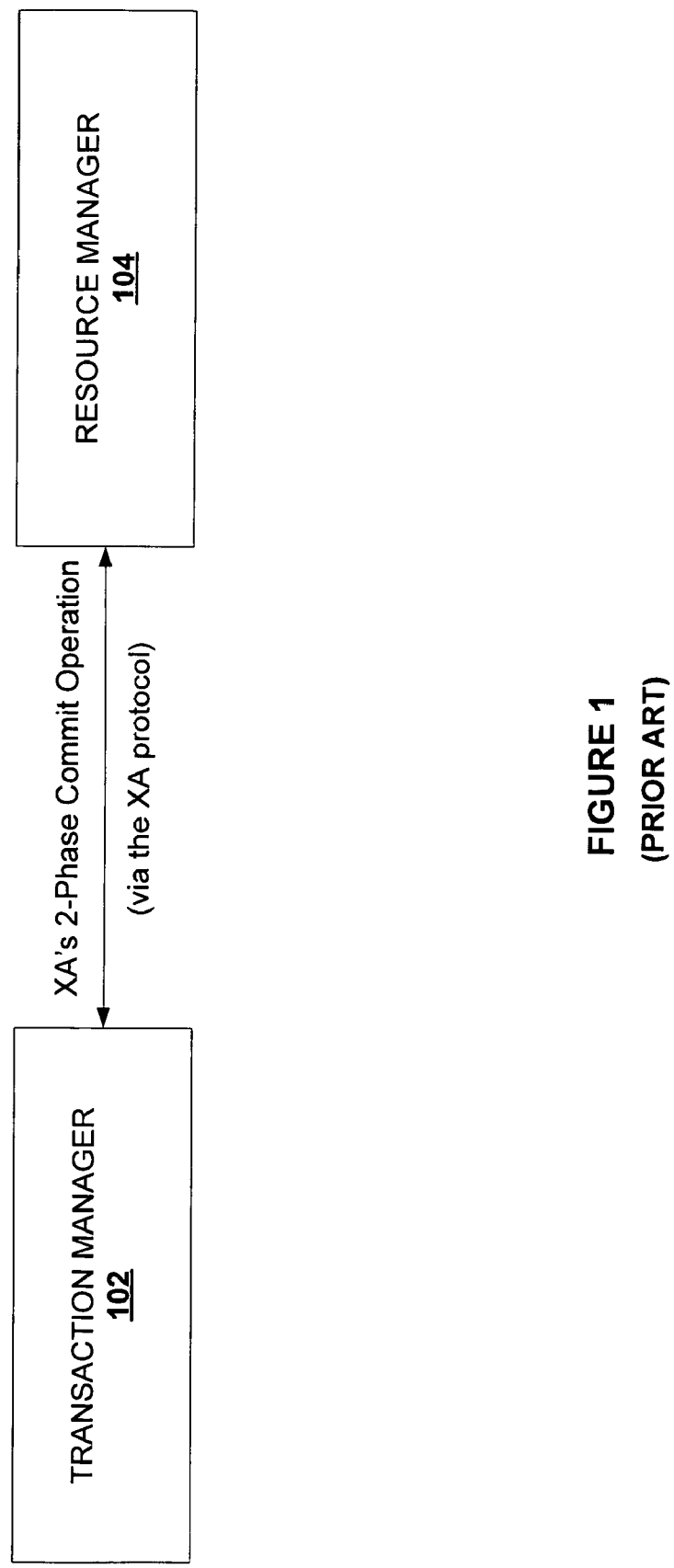
FIG. 1 illustrates a functional relationship between a transaction manager and a resource manager.
Figure 2:
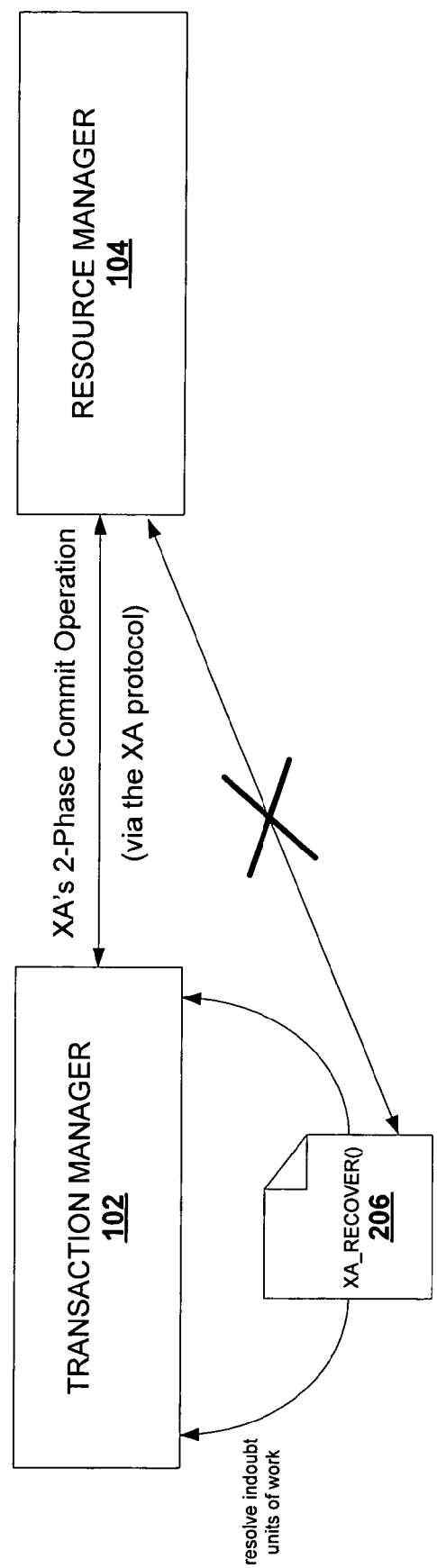
FIG. 2 illustrate a sample scenario where the XA protocol is less robust than other proprietary 2-phase commit protocols.
Figure 3:
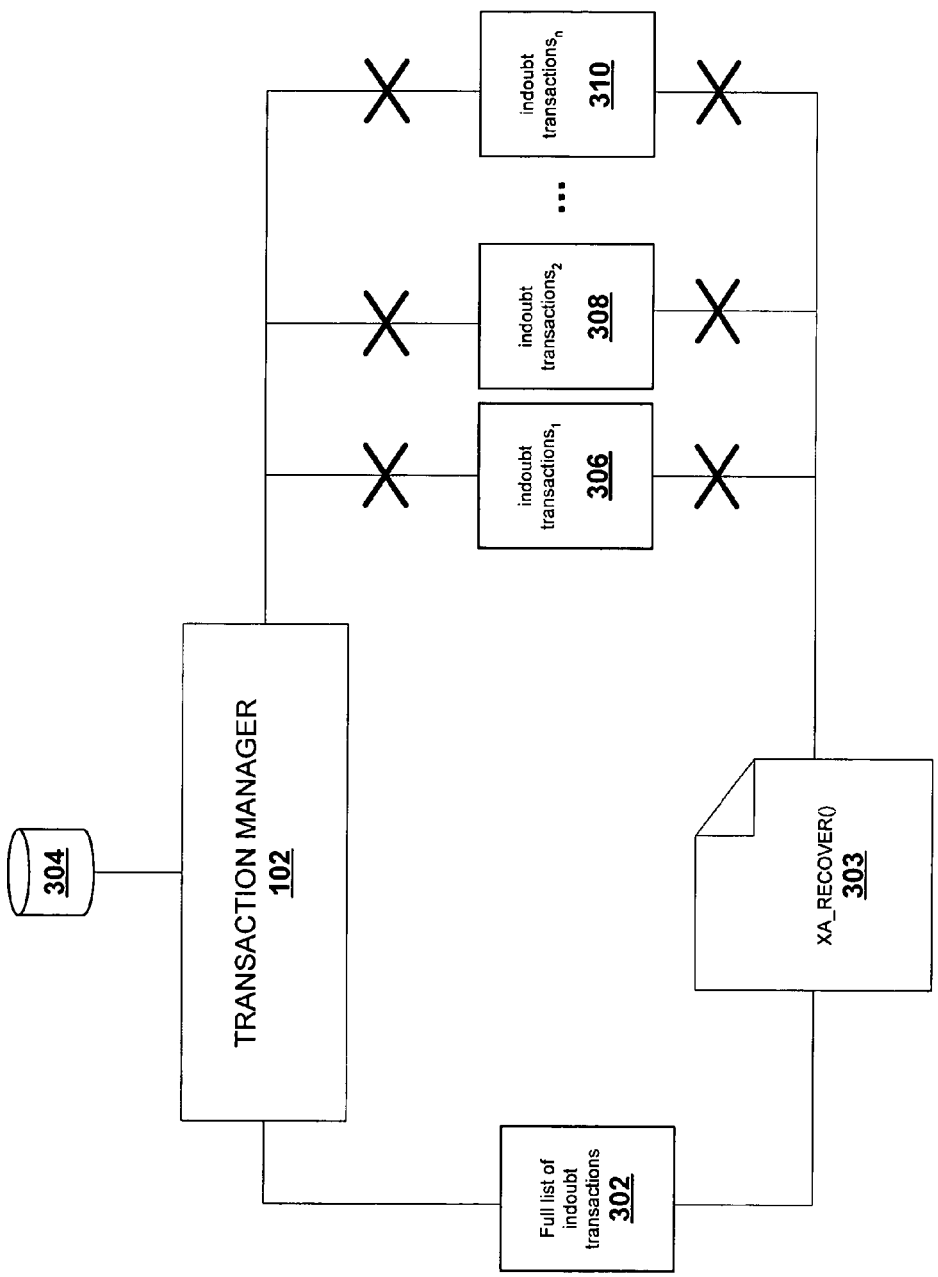
FIG. 3 illustrates a drawback of the XA protocol in its inability to address and resolve each individual indoubt transaction.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 4A:
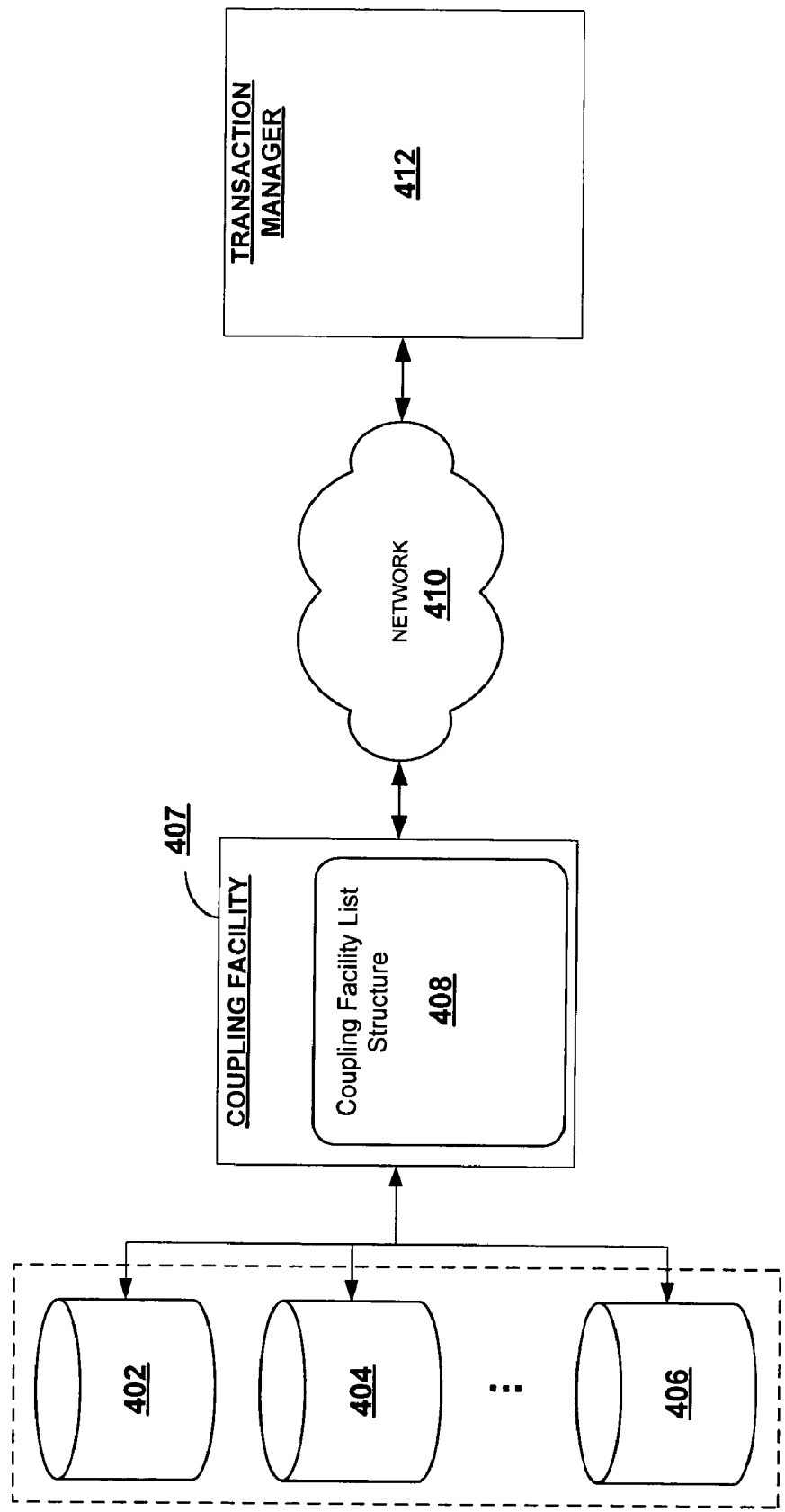
FIG. 4a illustrates another embodiment of the system of the present invention.

The present invention provides for a system and method FIG. 4a illustrates a system based upon the present invention that supports the XA 2-phase commit protocol in a clustered shared database. In this embodiment, a special shared memory device called the Coupling Facility (CF) 407 is used to record the indoubt transaction entries, in a coupling facility list structure 408, for each member of the database cluster 402, 404, and 406. Having the CF avoids the CPU cost and elapsed time impact of persisting this information to disk (either via a log write or a relational table I/O). The CF provides full read/write access and data coherency for concurrent access by all the members in the database cluster (represented in FIG. 4 as 402, 404, and 406). At any given point in time, the CF will contain the full list of indoubt transactions for the entire database cluster. Transaction manager 412 communicates with a client (e.g., a DB2 client), which in turn uses network 410 to communicate with a database (e.g., DB2) in the database cluster 402, 404, and 406. The database is then able to manipulate the CF 407 as needed.

Figure 4B:
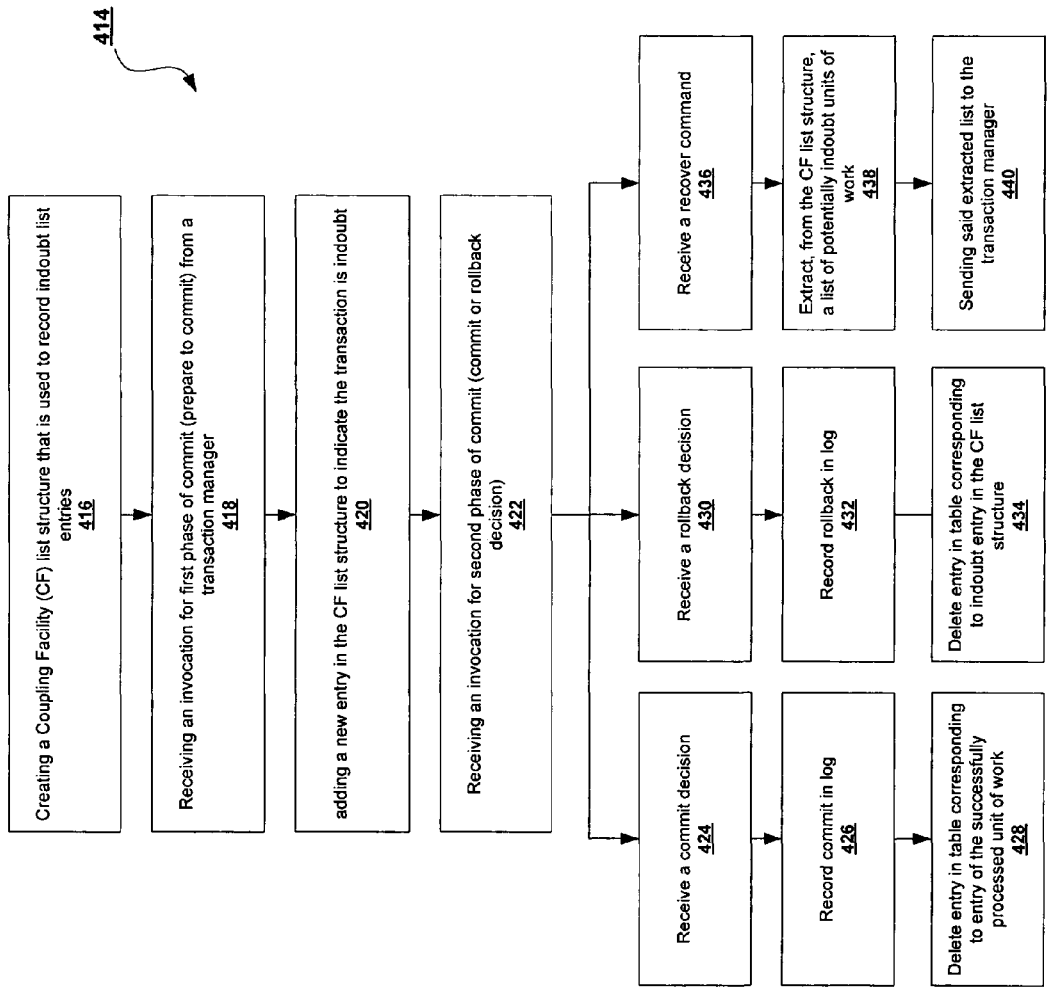

FIG. 4b illustrates method 414 associated with the system of FIG. 4a. During first time startup/install of the database system, in step 416, the coupling facility (CF) creates a coupling facility list structure for recording the XA indoubt list entries. In one embodiment, CF duplexing is used to insure that the list structure survives almost all feasible error scenarios.

In step 418, an XA transaction receives a "PREPARE TO COMMIT" message from the XA transaction manager on a database transaction that is not read-only. In step 420, the database system adds an entry in the CF list structure containing, in one embodiment, the XA global transaction identifier (GTRID), the timestamp when the entry was created, and a state indicating the transaction is INDOUBT. After creating this entry in the CF list structure, the database will record the normal log record indicating the unit of work is indoubt. Next, in step 422, the CF receives an invocation for a second phase of commit (commit or rollback decision) from the XA transaction manager.

After the completion of step 420, one of three steps follows. In step 424, the database server receives a COMMIT decision from the XA transaction manager. When this occurs, in step 426, the database engine records the commit decision on the log and, in step 428, deletes the entry in the CF list structure.

In step 430, a ROLLBACK decision is received from the XA transaction manager. When this occurs, in step 432, the database engine records the rollback decision on the log and, in step 434, deletes the entry in the CF list structure.

The network connection to the XA transaction manager or the database system can terminate abnormally before completing steps 424-428 or 430-434. If this occurs, as shown in steps 436-440, the CF list structure is used to respond to requests from the XA transaction manager to perform the XA RECOVER command.

If the network fails, the database system simply waits for the XA transaction manager to reconnect and perform the XA RECOVER command. If the database system terminates abnormally, prior to deleting the entry in the CF list structure, the database system will be restarted and go through both forward recovery and backward recovery.

Three possible situations can occur. If a commit or rollback decision is found on the log and the CF list entry still exists, the database system crashed after writing the log record (but before deleting the CF list entry). In this case, the database system simply deletes the CF list structure entry and continues restart processing.

If no commit or rollback decision is found on the log, the database examines the CF list structure entry to see if a commit or rollback decision has been received by another member of the database server cluster. If a commit or rollback decision was received, the database engine records the appropriate log record and deletes the CF structure entry.

If no commit or rollback decision is found on the log and no commit/rollback decision is present in the CF structure entry, the unit of work is still indoubt, so the database waits for the XA transaction manager to perform the XA RECOVER command.

When the database system receives an XA RECOVER request, the database examines the CF list structure and reports the GTRID of each indoubt unit of work to the XA transaction manager.

Upon receiving the list of indoubt GTRIDs, the XA transaction manager sends commit or rollback decisions for the units of work that are owned by the XA transaction manager. These decisions result in one of two outcomes. If the database cluster member that receives the decision actually owns the indoubt unit of work, the database will write the appropriate log record, delete the CF list structure entry, and complete the commit or rollback operation for the indoubt unit of work.

If the database cluster member that receives the decision does not own the indoubt unit of work, the database records the commit or rollback decision in the CF entry and record a log record reflecting this activity. The database then sends a CF notify message to cause the database member that owns the unit of work to resolve the indoubt unit of work (if the member is currently available).

Additionally, the present invention provides for an article of manufacture comprising computer readable program code contained within implementing one or more modules providing high performance support for XA protocols in a clustered shared database. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) creating a coupling facility list structure in a coupling facility; (b) receiving an instruction from a member in a database cluster to create an entry in the coupling facility list structure, wherein the instruction is sent by the member in the database cluster after receiving a PREPARE TO COMMIT message regarding a transaction from a transaction manager; (c) creating an entry corresponding to the transaction in the coupling facility list structure, wherein the entry comprises a global transaction identifier, a timestamp identifying when said entry was created, and a state indicating that said transaction is an indoubt transaction; (d) deleting said entry corresponding to said transaction upon successful completion of either a COMMIT or ROLLBACK decision in said database cluster;

if, in step (d), communication link between said coupling facility and database cluster or if communication link between the coupling facility and transaction manager failed, then said coupling facility:
  reestablishing communication links,
  receiving a RECOVER message from said transaction manager,
  transmitting a list of the global transaction identifiers to the transaction manager, wherein the transaction manager identifies associated indoubt entries, issues a COMMIT or ROLLBACK decision for said associated indoubt entries, and notifies other transaction managers corresponding to remainder of indoubt entries; and
  wherein, upon successful execution of said issued COMMIT or ROLLBACK decision, the coupling facility receives an instruction from a member in said database cluster for deleting corresponding entry in coupling facility list structure.

CONCLUSION

A system and method has been shown in the above embodiments for the effective implementation providing high performance support for XA protocols in a clustered shared database. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of graphics or object-oriented programming.

We claim:

1. A method for facilitating performance of 2-phase commit operations between transaction managers and resource managers in a database cluster, said method comprising the steps of:
  recording indoubt transaction entries for each member of a database cluster via a shared memory device; and upon detecting failure of a transaction manager,
  issuing instructions to perform a ROLLBACK or COMMIT based upon said recorded indoubt transaction entries in said shared memory device.

2. A method for facilitating performance of 2-phase commit operations between transaction managers and resource managers in a database cluster, as per claim 1, wherein said shared memory device is located remote from said database cluster.

3. A method for facilitating performance of 2-phase commit operations between transaction managers and resource managers in a database cluster, as per claim 1, wherein said method comprises the step of adding an indoubt entry in said shared memory device when a PREPARE TO COMMIT instruction is received by a member of said database cluster from a transaction manager.

4. A method for facilitating performance of 2-phase commit operations between transaction managers and resource managers in a database cluster, as per claim 1, wherein said method comprises the step of deleting an indoubt entry in shared memory device upon successful completion of a COMMIT or ROLLBACK instruction issued by a transaction manager to a member of said database cluster.

5. A method for facilitating performance of 2-phase commit operations between transaction managers and resource managers in a database cluster, as per claim 1, wherein, prior to said step of issuing instructions, said method comprises the steps of:
  transmitting a list of indoubt entries in said shared memory device to said transaction manager; and
  receiving a RECOVER instruction from said transaction manager, wherein said transaction manager receives said list of indoubt entries, identifies associated indoubt entries in said list, transmits a COMMIT or ROLLBACK instruction for said associated indoubt entries to said database system, and notifies owners of remainder of indoubt entries in said list.

6. A method for facilitating performance of 2-phase commit operations between transaction managers and resource managers in a database cluster, as per claim 1, wherein said recorded indoubt entries in said coupling facility list structure comprise: a global transaction identifier, a timestamp identifying when an entry was created, and a state indicating that a transaction is indoubt.

7. A method for facilitating performance of 2-phase commit operations between transaction managers and resource managers in a database cluster, as per claim 1, wherein members of said database cluster additionally maintain a log recording COMMIT, ROLLBACK, and RECOVER instructions.

8. A method for facilitating performance of 2-phase commit operations between transaction managers and resource managers in a database cluster, as per claim 7, wherein in the event of loss of data in said shared memory device, data sharing groups restart processing to reconstruct indoubt entries from said maintained log.

9. A method for facilitating performance of 2-phase commit operations between transaction managers and resource managers in a database cluster, as per claim 1, wherein communication link between said shared memory device and transaction managers are established over a network.

10. A method for facilitating performance of 2-phase commit operations between transaction managers and resource managers in a database cluster, as per claim 1, wherein said network is any of, or a combination of: a local area network (LAN), a wide area network, a wireless network, or the Internet.

11. A coupling facility recording indoubt transaction entries for each member of a remote database system, said coupling facility comprising:
   a) a coupling facility list structure recording indoubt entries associated with each member of said database system; and
   b) an interface for communicating with said database system and a transaction manager, said interface issuing instructions to perform a ROLLBACK or COMMIT based upon said recorded indoubt transaction entries in said coupling facility list structure.

12. A coupling facility recording indoubt transaction entries for each member of a remote database system, as per claim 11, wherein an indoubt entry is added in said coupling facility list structure when a PREPARE TO COMMIT instruction is received by said database system from said transaction manager.

13. A coupling facility recording indoubt transaction entries for each member of a remote database system, as per claim 11, wherein an indoubt entry is deleted in said coupling facility list structure upon successful completion of a COMMIT or ROLLBACK instruction issued by said transaction manager to said database system.

14. A coupling facility recording indoubt transaction entries for each member of a remote database system, as per claim 11, wherein, upon a network failure, a list of indoubt entries in said coupling facility list structure is sent to said transaction manager after receiving a RECOVER instruction, whereupon said transaction manager receiving said list of indoubt entries: identifies associated indoubt entries in said list, transmits a COMMIT or ROLLBACK instruction for said associated indoubt entries to said database system, and notifies owners of remainder of indoubt entries in said list.

15. A coupling facility recording indoubt transaction entries for each member of a remote database system, as per claim 11, wherein said recorded indoubt entries in said coupling facility list structure comprise: a global transaction identifier, a timestamp identifying when an entry was created, and a state indicating that a transaction is indoubt.

16. A coupling facility recording indoubt transaction entries for each member of a remote database system, as per claim 11, wherein said database system additionally maintains a log recording commit, rollback, and recover instructions.

17. A coupling facility recording indoubt transaction entries for each member of a remote database system, as per claim 16, wherein in the event of loss of data in said coupling facility list structure, data sharing groups restart processing to reconstruct said coupling facility list structure from said maintained log.

18. A coupling facility recording indoubt transaction entries for each member of a remote database system, as per claim 11, wherein communication link between said coupling facility and said transaction manager is established over a network.

19. A coupling facility recording indoubt transaction entries for each member of a remote database system, as per claim 18, wherein said network is any of, or a combination of: a local area network (LAN), a wide area network, a wireless network, or the Internet.

20. A coupling facility recording indoubt transaction entries for each member of a remote database system, as per claim 11, wherein more than one coupling facility list structures are used to improve the integrity of the coupling facility.

21. A coupling facility recording indoubt transaction entries for each member of a remote database system, as per claim 11, wherein said coupling facility is implemented as a memory device shared between said members of said remote database system.

22. An article of manufacture comprising computer usable medium having computer readable program code embodied therein facilitating performance of 2-phase commit operations between transaction managers and resource managers in a database cluster, said medium comprising:
   (a) computer readable program code recording indoubt transaction entries for each member of a database cluster via a shared memory device; and upon detecting failure of a transaction manager,
   (b) computer readable program code issuing instructions to perform a ROLLBACK or COMMIT based upon said recorded indoubt transaction entries in said shared memory device.

23. An article of manufacture as per claim 22, wherein said medium further comprises computer readable program code to add an indoubt entry in said shared memory device when a PREPARE TO COMMIT instruction is received by a member of said database cluster from a transaction manager.

24. An article of manufacture as per claim 22, wherein said medium further comprises computer readable program code to delete an indoubt entry in shared memory device upon successful completion of a COMMIT or ROLLBACK instruction issued by a transaction manager to a member of said database cluster.

25. An article of manufacture as per claim 22, wherein said medium further comprises:
   computer readable programmable code aiding in transmitting a list of indoubt entries in said shared memory device to said transaction manager; and
   computer readable program code aiding in receiving a RECOVER instruction from said transaction manager, wherein said transaction manager receives said list of indoubt entries, identifies associated indoubt entries in said list, transmits a COMMIT or ROLLBACK instruction for said associated indoubt entries to said database system, and notifies owners of remainder of indoubt entries in said list.

26. An article of manufacture as per claim 22, wherein said medium further comprises computer readable program code additionally maintains a log recording COMMIT, ROLLBACK, and RECOVER instructions.

27. An article of manufacture as per claim 26, wherein said medium further comprises computer readable program code restarting processing to reconstruct indoubt entries from said maintained log in the event of loss of data in said shared memory device.

* * * * *